United States Patent
Edmonds et al.

(10) Patent No.: US 10,041,619 B2
(45) Date of Patent: Aug. 7, 2018

(54) METHODS AND APPARATUSES TO MODERATE AN AIRFLOW

(71) Applicant: TRANE INTERNATIONAL INC., Piscataway, NJ (US)

(72) Inventors: David Edward Edmonds, Stoddard, WI (US); Randy Monroe Murphy, Versailles, KY (US); Stephen John Lind, Onalaska, WI (US); Yahia Abdelhamid, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 484 days.

(21) Appl. No.: 14/414,322

(22) PCT Filed: Jul. 12, 2013

(86) PCT No.: PCT/US2013/050257
§ 371 (c)(1),
(2) Date: Jan. 12, 2015

(87) PCT Pub. No.: WO2014/011980
PCT Pub. Date: Jan. 16, 2014

(65) Prior Publication Data
US 2015/0211670 A1 Jul. 30, 2015

Related U.S. Application Data

(60) Provisional application No. 61/670,846, filed on Jul. 12, 2012, provisional application No. 61/773,554, filed on Mar. 6, 2013.

(51) Int. Cl.
*F25D 19/00* (2006.01)
*F16L 55/027* (2006.01)
(Continued)

(52) U.S. Cl.
CPC ... *F16L 55/02709* (2013.01); *F16L 55/02718* (2013.01); *F24F 1/02* (2013.01);
(Continued)

(58) Field of Classification Search
CPC . F16L 55/02709; F16L 55/02718; F24F 1/40; F24F 13/24; F24F 13/082; F24F 1/02; F24F 2221/16; F24F 7/10; F25B 2500/12
See application file for complete search history.

(56) References Cited

U.S. PATENT DOCUMENTS 4,439,219 A * 3/1984 Lambrecht ......... B01D 46/0005
248/231.21
4,478,056 A 10/1984 Michaels, Jr.
(Continued)

FOREIGN PATENT DOCUMENTS

AU 2010219283 B2 4/2016
CN 1537213 A 10/2004
(Continued)

OTHER PUBLICATIONS

Translation of Description of DE4426218A1 retrieved on Nov. 14, 2017.*
(Continued)

*Primary Examiner* — Orlando E Aviles Bosques
(74) *Attorney, Agent, or Firm* — Hamre, Schumann, Mueller & Larson, P.C.

(57) ABSTRACT

Methods and apparatus to reduce instabilities and/or turbulence of an airflow of a HVAC system are described. The method may include positioning an airflow moderating zone in an airflow passage to reduce instabilities and/or turbulence in the airflow. Apparatuses to create the airflow moderating zone are also provided. The apparatus may be configured to have a plurality of openings and an airflow resistance structure so as to provide airflow resistance to
(Continued)

instabilities and/or turbulence in the airflow. The airflow moderating zone may be, for example, a sheet-like material including a plurality of openings.

4 Claims, 15 Drawing Sheets

(51) Int. Cl.
*F24F 7/10* (2006.01)
*F24F 1/02* (2011.01)
*F24F 13/24* (2006.01)
*F24F 13/08* (2006.01)
*F24F 1/40* (2011.01)

(52) U.S. Cl.
CPC ............... *F24F 1/40* (2013.01); *F24F 7/10* (2013.01); *F24F 13/082* (2013.01); *F24F 13/24* (2013.01); *F24F 2221/16* (2013.01); *F25B 2500/12* (2013.01); *F25B 2500/13* (2013.01)

(56) References Cited

U.S. PATENT DOCUMENTS

| | | | |
|---|---|---|---|
| 4,549,848 A | 10/1985 | Wallman | |
| 5,088,886 A | 2/1992 | Hopkins | |
| 5,099,879 A | 3/1992 | Baird | |
| 5,618,162 A | 4/1997 | Chan et al. | |
| 5,787,717 A | 8/1998 | Bang | |
| 5,890,367 A * | 4/1999 | You | F24F 3/161 454/187 |
| 6,071,079 A | 6/2000 | Litvin | |
| 6,148,954 A | 11/2000 | Harris | |
| 6,503,060 B1 | 1/2003 | Kamada et al. | |
| 6,533,543 B2 | 3/2003 | Tagomori et al. | |
| 6,827,180 B2 | 12/2004 | Wilson | |
| 7,513,741 B2 | 4/2009 | Smiley, III et al. | |
| 7,942,234 B2 | 5/2011 | Utsunomiya | |
| 7,963,362 B2 | 6/2011 | Lidoine | |
| 7,996,957 B2 | 8/2011 | Kah, Jr. | |
| 8,033,358 B2 | 10/2011 | Ivers | |
| 8,033,783 B2 | 10/2011 | Ishikawa et al. | |
| 9,057,553 B1 * | 6/2015 | Metzger | F24F 13/00 |
| 2008/0203866 A1 * | 8/2008 | Chamberlain | F24F 1/0007 312/236 |
| 2012/0012662 A1 * | 1/2012 | Leen | F24F 11/0012 236/51 |
| 2012/0118408 A1 * | 5/2012 | Holmgren | F16L 55/02709 137/560 |
| 2014/0209275 A1 | 7/2014 | Schöne et al. | |

FOREIGN PATENT DOCUMENTS

| | | | |
|---|---|---|---|
| CN | 101311637 A | 11/2008 | |
| CN | 101457975 | 6/2009 | |
| DE | 2456521 A1 | 8/1976 | |
| DE | 4426218 A1 * | 1/1996 | ............... F24F 3/16 |
| EP | 2816295 A2 | 12/2014 | |
| JP | 10-141753 | 5/1998 | |
| JP | 11257702 | 9/1999 | |
| JP | 2006-336281 | 12/2006 | |
| WO | 2014056657 | 8/2013 | |

OTHER PUBLICATIONS

International search report for International application No. PCT/US2013/050257, dated Oct. 16, 2013 (3 pages).

Written opinion for international application No. PCT/US2013/050257, dated Oct. 16, 2013 (5 pages).

* cited by examiner

METHODS AND APPARATUSES TO MODERATE AN AIRFLOW

FIELD OF TECHNOLOGY

Embodiments disclosed herein relate generally to a fan. More particularly, the embodiments disclosed herein relate to reducing instabilities and/or turbulence in an airflow flowing toward a fan of, for example, a heating, ventilation, air conditioning (HVAC) system during operation.

BACKGROUND

A HVAC system typically has a fan to propagate an airflow to facilitate, for example, heat exchange between an interior and an exterior of the HVAC system. The fan, such as a plenum fan, typically has an air inlet and an air outlet. When the fan is in operation, air can be sucked into the inlet and dispersed by, for example, a centrifugal force generated by an impeller of the plenum fan.

Operation of the fan of the HVAC system can produce noise. Instabilities and/or turbulence (such as eddies) in an airflow sucked into the inlet of the fan may cause noise when the airflow interacts with the impeller of the fan. Multiple reasons can cause the instabilities and/or turbulence in the airflow moving toward the inlet. For example, when an air duct leading to the air inlet has a sharp turn positioned relatively close to the air inlet, the turn may generate instabilities and/or turbulence in the airflow moving toward the air inlet.

SUMMARY

A HVAC system may generally have an airflow propagation system that includes an airflow path and a fan configured to propagate an airflow inside the airflow path. Instabilities and/or turbulence in the airflow can create noise when the airflow interacts with an impeller of the fan. Reducing instabilities and/or turbulence of the airflow may help reduce the noise level of the HVAC system and may help the fan run smoothly.

Methods and apparatuses to reduce instabilities and/or turbulence of an airflow are described herein. In one embodiment, a method may include propagating an airflow through an airflow path, and propagating the airflow through an airflow moderating zone that is positioned in front of an air inlet of a fan. The airflow moderating zone may be configured to have a depth along the airflow path so as to reduce instabilities and/or turbulence in the airflow moving toward the air inlet of the fan. In some embodiments, the method may include allowing at least a portion of the airflow to pass through the airflow moderating zone, and providing airflow resistance in a direction that is about perpendicular or angular to a direction of the airflow path to reduce instabilities and/or turbulence of the airflow in the airflow moderating zone.

In some embodiments, when the airflow makes a sharp turn in the airflow path, the airflow moderating zone may provide a smooth turn to help reduce instabilities and/or turbulence in the airflow.

In another embodiment, an airflow system of the HVAC may include an airflow path and an airflow moderating apparatus creating an airflow moderating zone in the airflow path before an air inlet of a fan. The airflow moderating apparatus may be configured to have an air flow-through structure that has a plurality of openings through an airflow resistance structure. At least a portion of the airflow moderating apparatus may be positioned at an angle to a direction of the airflow path. In some embodiments, the airflow moderating apparatus may be planar. In some other embodiments, the airflow moderating apparatus can have at least one wedge having a peak pointing against the direction of the airflow path. In some embodiments, the airflow moderating apparatus may be a perforated sheet-like material.

In some embodiments, the airflow moderating apparatus may include a sheet-like material configured to have an airflow flow-through structure that has a plurality of openings through an airflow resistance structure, and at least a portion of the sheet-like material may be positioned diagonally to a direction of the airflow path.

In some embodiments, the airflow moderating apparatus may include a plurality of discrete curved flow directors positioned in the airflow path. In some embodiments, centerlines of the plurality of discrete curved flow directors may be aligned in a line that is diagonal to the moving direction of the airflow. Each of the curved flow directors may be configured to have an arc that arches away from an opening, through which the airflow turns.

In some embodiments, the airflow moderating apparatus may be configured to have a turning vane that brackets the opening. The turning vane may include a first curved flow director and a second curved flow director. The first curved flow director and the second curved flow directors are configured to direct the airflow to turn between the first curved flow director and the second curved flow director toward the inlet of the airflow.

Other features and aspects of the fluid management approaches will become apparent by consideration of the following detailed description and accompanying drawings.

BRIEF DESCRIPTION OF THE DRAWINGS

FIG. 3A is a side schematic view of a HVAC system with an airflow moderating apparatus.

FIG. 3B is a front perspective view of an airflow path of the HVAC system as shown in FIG. 3A.

FIG. 3C illustrates a structure of area 3C in FIG. 3B.

FIG. 5A is a side schematic view of a HVAC system with airflow moderating apparatuses.

FIG. 5B is a front perspective view of an airflow inlets of the HVAC system of FIG. 5A.

FIG. 7A is a side schematic view of a HVAC system with the airflow moderating apparatus.

FIG. 7B is a front view of a portion of the airflow moderating apparatus.

FIG. 7C illustrates area 7C in FIG. 7B.

FIG. 9A is a side schematic view. FIG. 9B illustrated a curved flow director used in the embodiment as illustrated in FIG. 9A.

DETAILED DESCRIPTION

A HVAC system may include an air handler to propagate air through the HVAC system. The air handler often includes a fan. An operation noise level of the fan, for example, a direct drive plenum fan of a HVAC system, can be affected by instabilities and/or turbulence in the airflow sucked into an inlet of the fan. When the airflow containing instabilities and/or turbulence is sucked into the inlet and interacts with the impeller of the fan, the instabilities and/or turbulence in the airflow can cause noise. Even when the noise level may not be a primary concern, instabilities and/or turbulence may still contribute to vibrations of the HVAC system, which can reduce the performance and/or service life of the HVAC system.

In the following description of the illustrated embodiments, methods and apparatuses configured to reduce instabilities and/or turbulence of an airflow in an airflow passage of the HVAC system are described. The general principle of reducing instabilities and/or turbulence in the airflow passage of the HVAC system is to create an airflow moderating zone in front of an air inlet of a fan of the HVAC system. The air moderating zone may be configured to have a depth along the airflow path. In some embodiments, the air moderating zone may be configured to allow at least a portion of the airflow to flow through and provide airflow resistance in a direction that is perpendicular and/or angular to a direction of the airflow path, so as to reduce the instabilities and/or turbulence in the airflow. Embodiments of airflow moderating apparatuses to create the airflow moderating zone are also described. Reducing the instabilities and/or turbulence in the airflow can help reduce the sound and vibration level of the HVAC system, and increase the performance and/or service life of the HVAC system.

References are made to the accompanying drawings that form a part hereof, and in which is shown by way of illustration of the embodiments in which the embodiments may be practiced. The term "moving direction" refers to a general direction of an airflow. It is to be understood that the moving direction does not refer to airflow movement in a microscopic level, in which the air can move in any direction. When the airflow path is provided, the moving direction of the airflow is generally along with a direction of the airflow path. The arrows in the figures correspond to the general moving direction of the airflow. It is to be understood that the terms used herein are for the purpose of describing the figures and embodiments and should not be regarded as limiting the scope of the present application.

Figure 1:
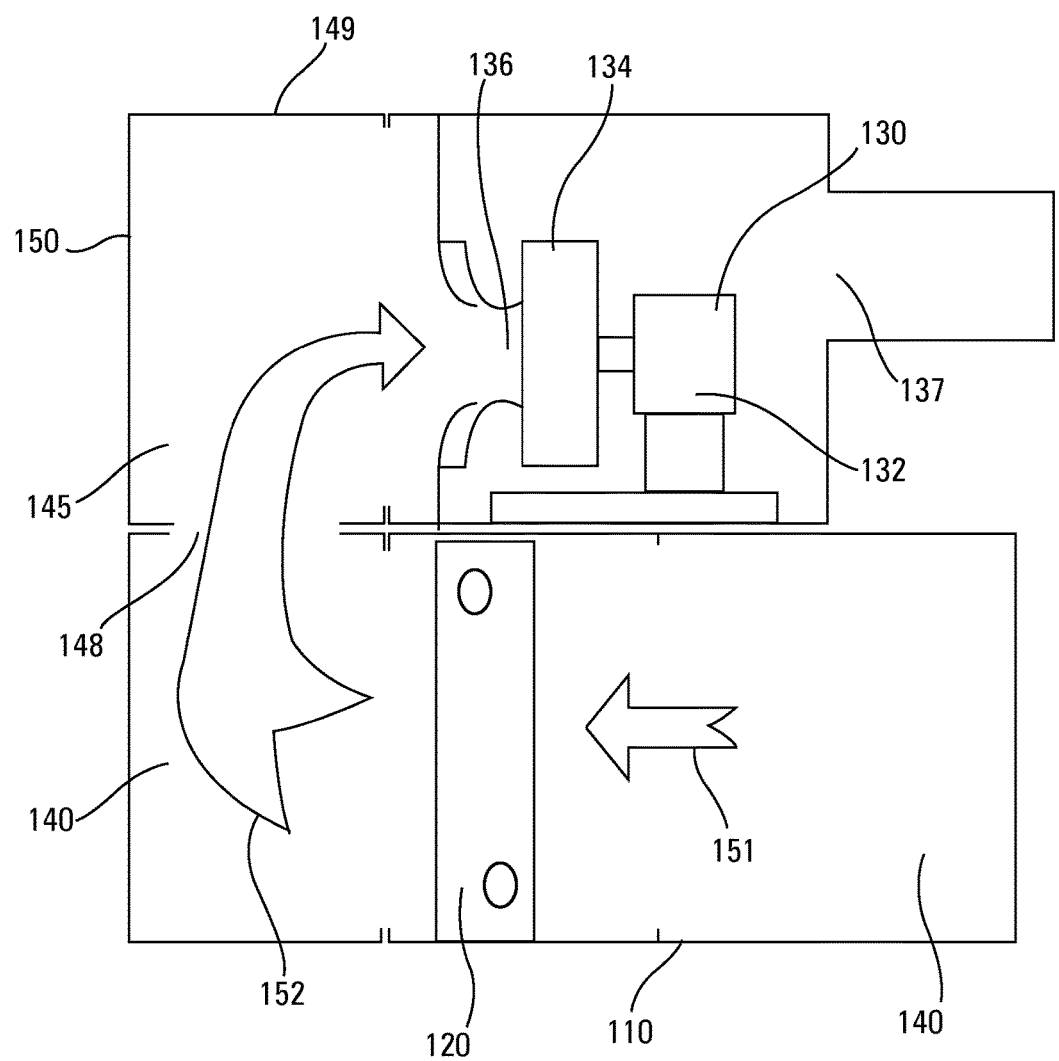
FIG. 1 illustrates a portion of an airflow passage system of a HVAC system with a turn in an airflow path.

Embodiments as described herein can be generally used in a commercial or residential HVAC system 100 as illustrated in FIG. 1. The HVAC system 100 typically includes a housing 110 that encloses a heat exchanger 120 and a fan 130. The fan 130 can be configured to create and propagate an airflow through an internal airflow path of the HVAC system 100 to, for example, facilitate heat exchange. The fan 130 has a motor 132 and impeller 134. Typically, the fan 130 has an air inlet 136, which in some embodiments can be configured to have a cone shape, and an air outlet 137.

The housing 110 of the HVAC system 100 as illustrated in FIG. 1 has a lower airflow path 140 and an upper airflow path 145. The lower airflow path 140 is in fluid communication with the upper airflow path 145 through an opening 148. The fan 130 is positioned in the upper airflow path 145 and the heat exchanger 120 is positioned in the lower airflow path 140. Instabilities and/or turbulence may be created by propagating an airflow from the lower airflow path 140 to the upper airflow path 145 by the fan 130 in the illustrated embodiment because of, for example, a relatively sharp turn, or abrupt change in direction of the airflow path, between the lower airflow path 140 and the upper airflow path 145.

Operation of the fan 130 can create and propagate an airflow as shown by arrows in the lower and upper airflow paths 140 and 145 respectively. In the illustrated embodiment, air gets into the internal space of the housing 110 in the lower airflow path 140, and creates an airflow 151 that generally has a straight moving direction. The straight moving airflow 151 passes through the heat exchanger 120. After passing the heat exchanger 120, the lower airflow path 140 is in fluid communication with the upper airflow path 145 through the opening 148. As shown in FIG. 1, from the lower airflow path 140 to the upper airflow path 145, the moving direction of the airflow 151 turns about 180 degrees, creating a deviated airflow 152. When airflow is propagated through the deviation created by the sharp turning from the lower airflow path 140 to the upper airflow path 145, instabilities and/or turbulence may be created in the deviated airflow 152. In a microscopic level, the instabilities and/or turbulence may move in directions that are different from the general moving direction of the deviated airflow 152, which is generally the same as the direction of the upper airflow path 145. As a result, when the deviated airflow 152 is sucked into the air inlet 136 and interacts with the impeller 134, the instabilities and/or turbulence may generate noise when the deviated airflow 152 interacts with the impeller 134.

It is noted that the instabilities and/or turbulence in an airflow may also be created by other ways, such as an opening on a top side 149 and/or front side 150 of the upper flow passage 145, or an opening on a left (and/or right) side of the upper flow passage (not shown). The deviated airflow 152 may generally include an airflow portion that moves in the general moving direction of the deviated airflow 152 (which is about the same as the direction of the airflow path 140), as well as the instabilities and/or turbulence in the airflow that can, for example, include eddies and swirls, or generally an airflow portion moving in directions that is different from (for example perpendicular to) the general moving direction of the deviated airflow 152 in a microscopic level.

Figure 2:
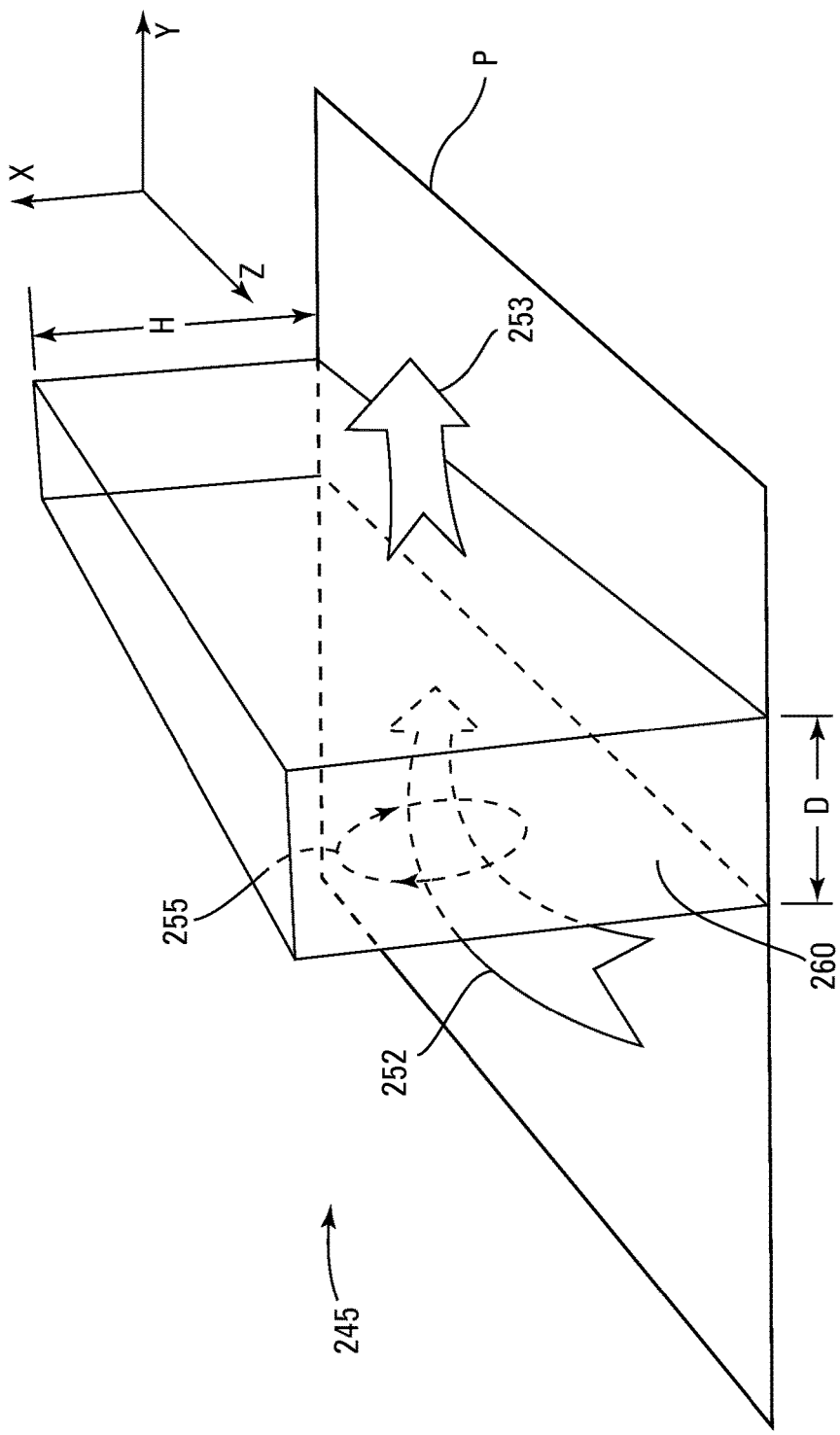
FIG. 2 illustrates a schematic view of a system to moderate an airflow.

Referring now to FIG. 2, a general approach to reduce instabilities and/or turbulence in a deviated airflow 252 is illustrated. As illustrated, a space 245 is defined by X, Y and Z axes. The space 245 can be generally correlated to the space of the upper airflow path 145 as shown in FIG. 1. A bottom of the upper airflow path 145 is generally represented by a plane P that is defined by the Y and Z axes. And the space 245 has a height H along the X axis, which can be generally correlated to a height of the upper airflow path 145.

Similar to the deviated airflow 152 as illustrated in FIG. 1, the deviated airflow 252 moves upwardly from below the plane P and turns about 90 degrees after passing the plane P. Because of the space restraint in the upper airflow path (e.g. the upper airflow path 145 in FIG. 1), after turning, the deviated airflow 252 moves in a direction that is generally parallel to the Y axis, as shown by the arrowhead of the deviated airflow 252. The deviated airflow 252 may also include instabilities and/or turbulence that swirls or moves in a plane 255 that is generally perpendicular or angular to the Y axis. Referring to FIGS. 1 and 2, the plane 255 is about parallel to a plane of the inlet 136 in FIG. 1. It is noted that the plane 255 is exemplary; the instabilities and/or turbulence can swirl or move in other directions or planes.

An airflow moderating zone 260 is positioned after the deviated airflow 252 turns in the space 245. The airflow moderating zone 260 generally has a depth D along the Y axis, which is about parallel to the general moving direction of the deviated airflow 252 after turning. After passing through the airflow moderating zone 260, the deviated airflow 252 becomes a moderated airflow 253. The moderated airflow 253 can then enter the air inlet 136 as shown in FIG. 1.

The airflow moderating zone 260 is configured so that at least a portion of the airflow 252 can pass through the airflow moderating zone 260 in the general moving direction, and as a general principle the airflow moderating zone 260 can be configured to provide relatively low airflow resistance to the general moving direction of the airflow 252. The airflow moderating zone 260 can also be configured to provide airflow resistance to the instabilities and/or turbulence in the airflow 252 that swirl or move in the plane 255 along the depth D, so that instabilities and/or turbulence of the airflow 252 can be reduced. As a general principle the airflow moderating zone 260 can be configured to provide a sufficient airflow resistance in a plane that is perpendicular and/or angular to the general moving direction (e.g. a plane defined by X and Y axes in FIG. 2, such as the plane 255) along the depth D to reduce the instabilities and/or turbulence in the airflow 252. Consequently, when the moderated airflow 253, for example, interacts with the impeller 136 of the fan 130 such as shown in FIG. 1, the sound level can be reduced compared to the sound level as if the deviated airflow 242 interacts with the impeller 136 without moderation.

It is to be appreciated that the embodiment as illustrated in FIG. 2 is exemplary. The instabilities and/or turbulence may be reduced by other ways in the airflow moderating zone 260. In some embodiments, the instabilities and/or turbulence in the airflow 252 can be reduced by providing a smooth turn between, for example, a lower airflow path (such as the lower airflow path 140 in FIG. 1) and an upper airflow path (such as the upper airflow path 145 in FIG. 1). As discussed herein, some embodiments of an airflow moderating apparatus may be configured to provide both a smooth turn and airflow resistance to instabilities and/or turbulence.

Figure 3A:
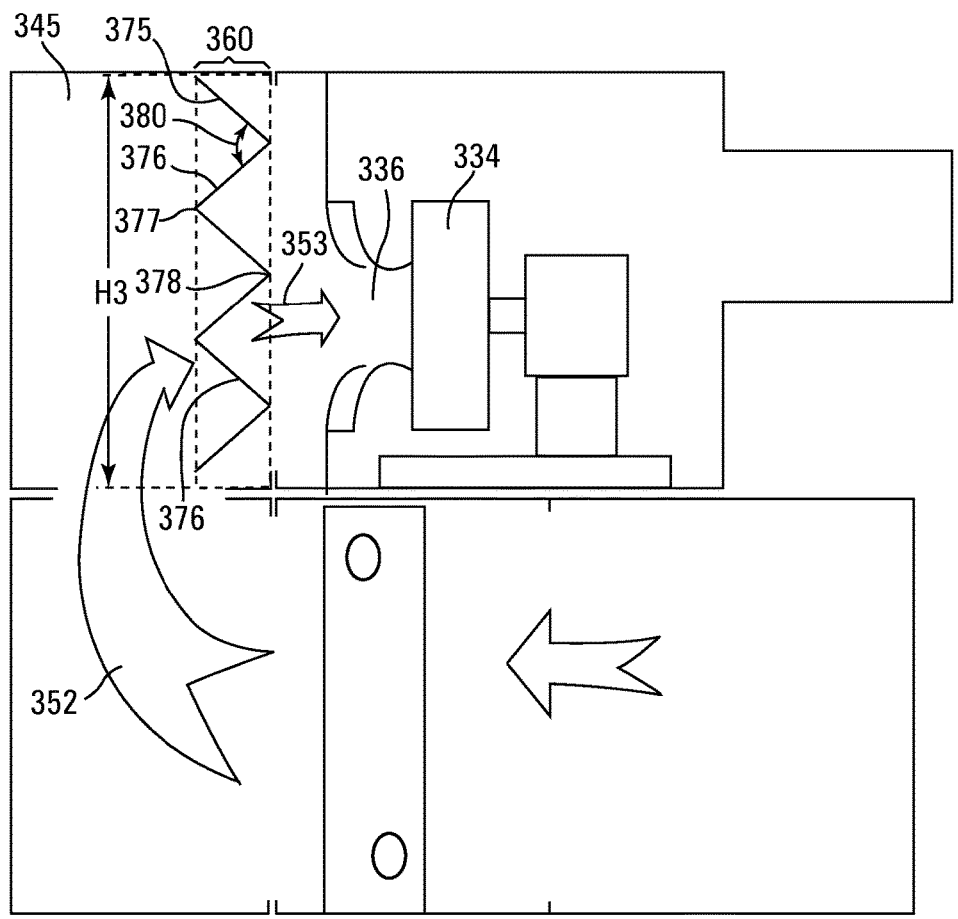
FIGS. 3A to 3C illustrate an embodiment of an airflow moderating apparatus.
Figure 3B:
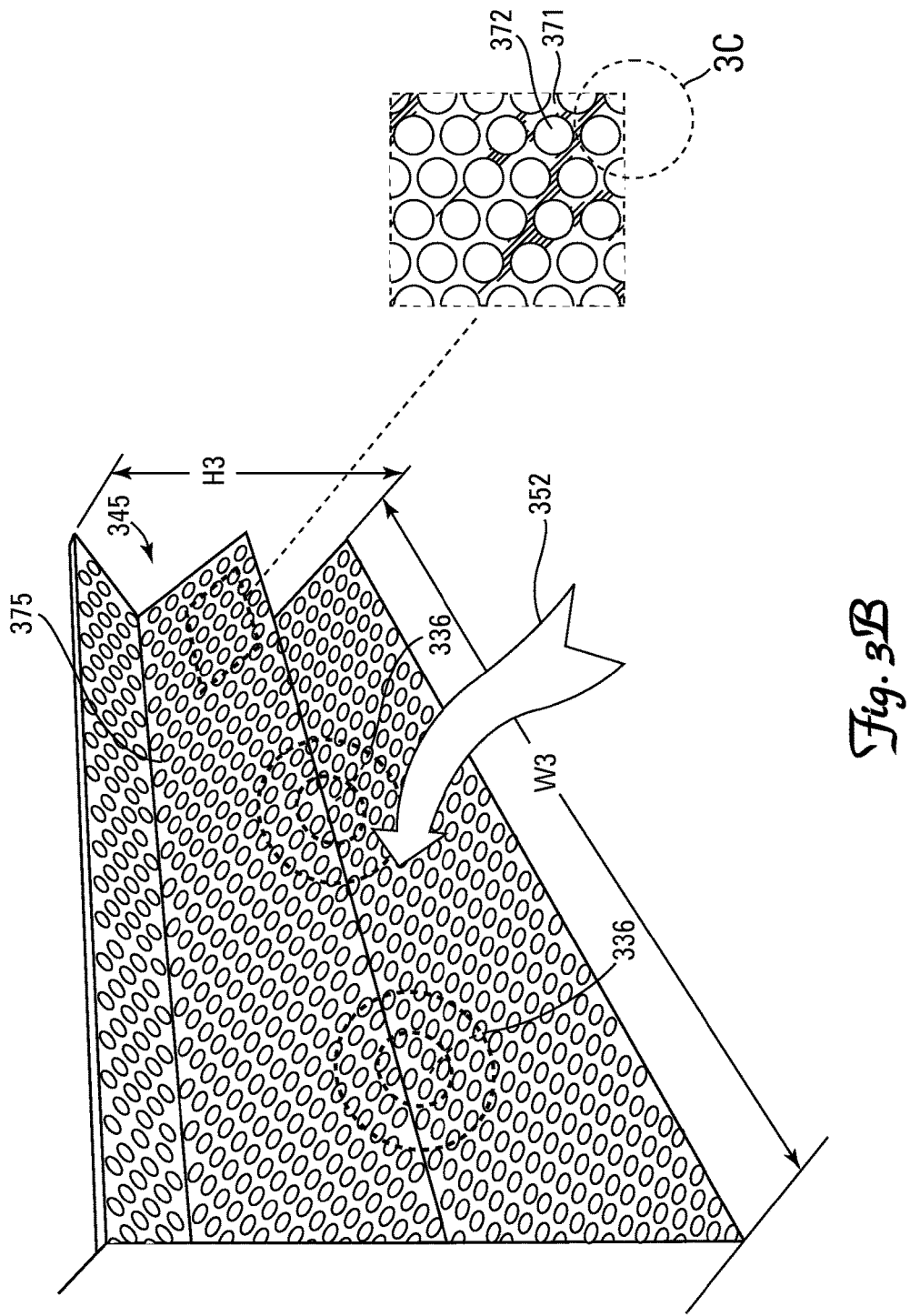
Figure 3C:
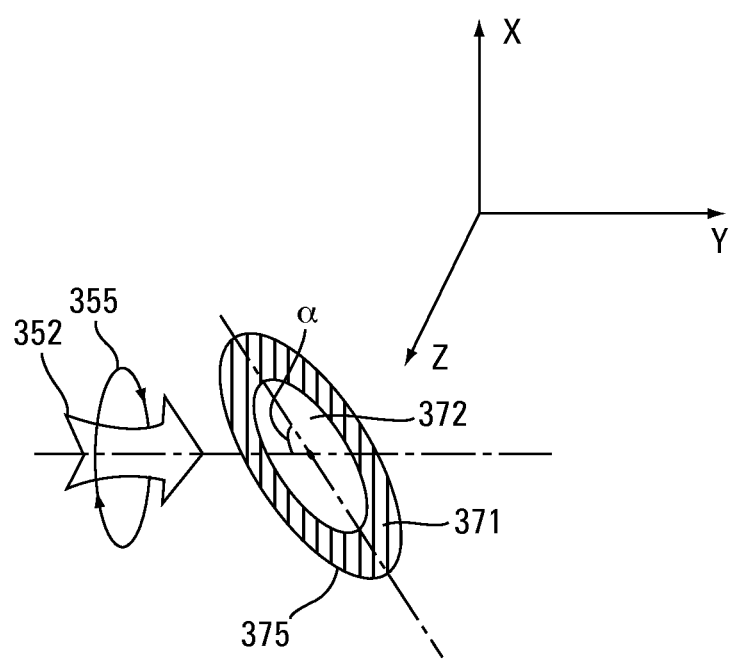

FIGS. 3A to 3C illustrate an apparatus 375 to create an airflow moderating zone 360. The airflow moderating apparatus 375 is a substantially sheet-like material that is configured to have a plurality of wedges 376. The wedges 376 have peaks 377 and valleys 378. The peaks 377 are configured to point against a general moving direction of a deviated airflow 352 after the deviated airflow 352 turns. The airflow moderating apparatus 375 has a height H3 that is substantially the same as a height of an upper airflow path 345. Consequently, a substantial portion of the deviated airflow 352 can be moderated by the airflow moderating zone 360 created by the airflow moderating apparatus 375. A moderated airflow 353 can be sucked into the air inlet 336 by the rotation of the impeller 334.

The wedges 376 have an angle 380. In the illustrated embodiment, the angle is about 60 degrees, with the appreciation that the angle can be different from 60 degrees. In the illustrated embodiment, there are two wedges 376 and three valleys 378 pointing against the general moving direction of the deviated airflow 352. However, it is to be understood that the number of wedges 376 is just exemplary. The number of the wedges 376 can be determined, for example, by testing.

Referring now to FIG. 3B, a front view of the upper airflow path 345 is illustrated. The airflow moderating apparatus 375 substantially covers a width W3 of the upper airflow path 345. The illustrated embodiment is configured to have a plurality of air inlets 336 to the fans (not shown). The airflow moderating apparatus 375 is configured to cover all of the air inlets 336. It is to be noted, as shown later in the description, that each air inlet 336 can be configured to have its own airflow moderating apparatus 375. If the airflow moderating apparatus 375 is configured to cover each individual air inlet 336 of the plurality of air inlets 336, the width W3 and the height H3 may not be substantially the same as the width and height of the upper airflow path 345. (For example, see FIG. 5B for one embodiment of airflow moderating apparatus 575b that is configured to cover each of the inlets 536.)

The airflow moderating apparatus 375 can be a perforated sheet-like material and is configured to have an air flow-through structure that includes a plurality of openings 372 through an airflow resistance structure 371. The solid part of the perforated sheet-like material can correspond to the airflow resistance structure 371. The perforated sheet-like material can be made of metal, plastic or any other suitable materials.

The operation of the apparatus illustrated in FIGS. 3A and 3B is further illustrated in FIG. 3C. FIG. 3C shows a portion 3C in FIG. 3B. In operation, the opening 372 generally allows at least a portion of the airflow in the general moving direction of the deviated airflow 352 to pass. The airflow resistance structure 371 is generally diagonally positioned relative to the general moving direction of the deviated airflow 352. The airflow resistance structure 371 can provide airflow resistance to instabilities and/or turbulence that, for example, swirls in a plane 355 that is generally perpendicular to the general moving direction of the airflow 352, and consequently reduce the instabilities and/or turbulence in the airflow 352. The airflow resistance provided by the airflow resistance structure 371 can be in a direction that is generally perpendicular to and/or angular to the general moving direction of the airflow 352.

An angle α, which is the angle between the surface of the airflow moderating apparatus 375 and the moving direction of the airflow 352, can be in the range of about 0 and 180 degrees. In some embodiments, the angle α can be for example about ~30 degrees, ~45 degrees, ~60 degrees, ~120 degrees, ~135 degrees, or ~150 degrees. The angle α can be determined, for example, by testing. To create a depth of the airflow modulating zone 360 that is sufficient to achieve desired instability and/or turbulence reduction, in some cases the angle α is generally not 90 degrees so as to create the depth D when a sheet-like material is used as the air modulating apparatus 375.

Figure 4:
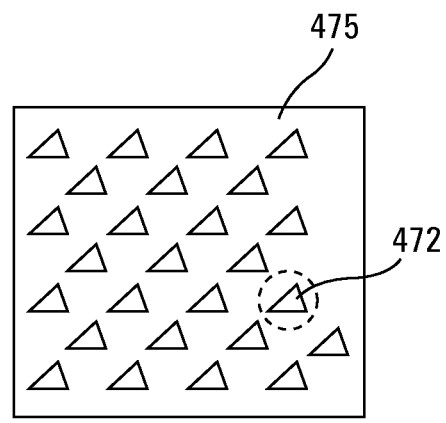
FIG. 4 illustrates another embodiment of an airflow moderating apparatus.

In the illustrated embodiment of FIG. 3B, the shape of the openings 372 is a substantially circular shape. This is exemplary. As illustrated in FIG. 4, in another embodiment of an airflow moderating apparatus 475 the shape of openings 472 can be a substantially triangle shape. In general, the openings 472 can be any other suitable shapes.

The ratio of the total area of the openings (e.g. the openings 372 or the openings 472) relative to the total area of the airflow moderating apparatus (e.g. the airflow moderating apparatus 375 or the airflow moderating apparatus 475) can be in a range from about 9:1 to 1:9. In one embodiment, the total area of the opening is about, for example, 60-70% of the total area of the air modulating apparatus.

Figure 5A:
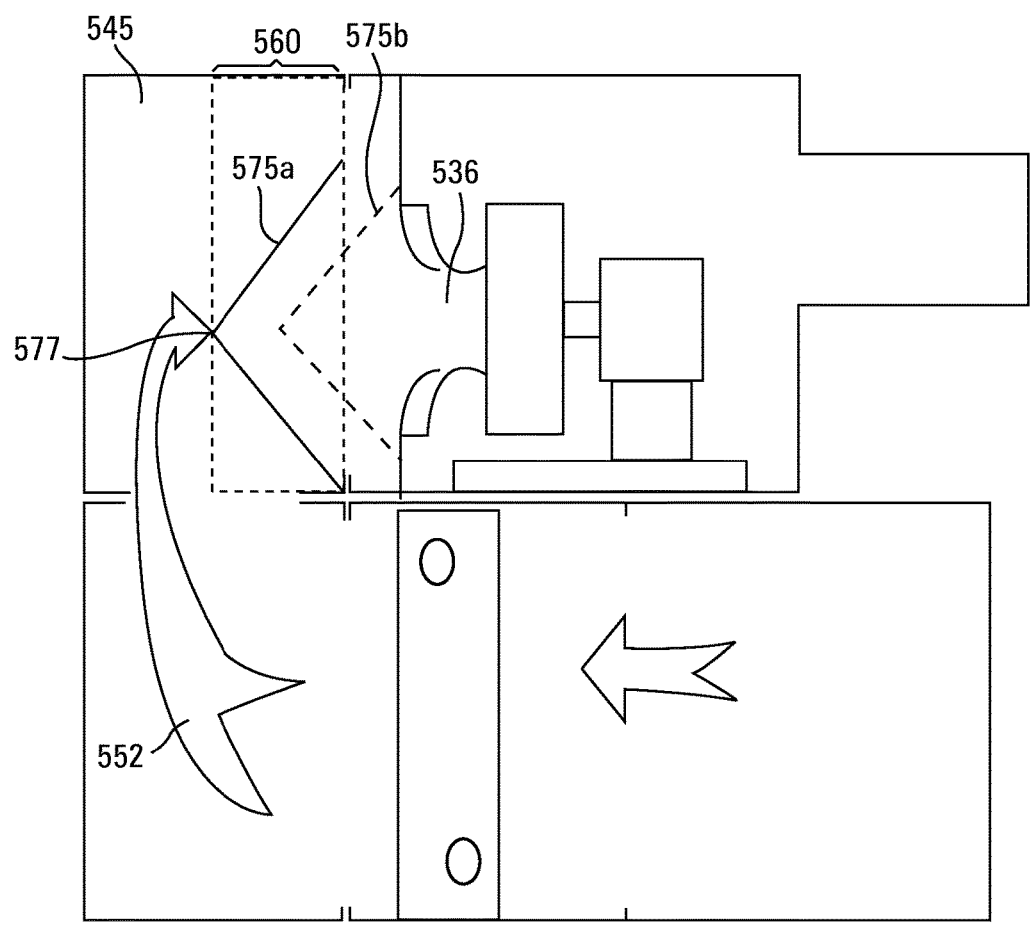
FIGS. 5A and 5B illustrate some other embodiments of an airflow moderating apparatus.

Referring now to FIG. 5A, another embodiment of an airflow moderating apparatuses 575a to create an airflow moderating zone 560 is illustrated. The airflow moderating apparatus 575a is configured to have one wedge, and a peak 577 of the wedge is configured to point against the moving direction of a deviated airflow 552. As shown in FIG. 5A, the airflow moderating apparatus 575a does not have to cover the whole height of an upper airflow path 545. The airflow moderating apparatus 575a is generally configured so that at least a substantial portion (for example about 60%, or e.g. 58%) of the airflow 552 can be moderated (i.e. can interact with the airflow moderating apparatus 575a) in the airflow moderating zone 560 before being sucked into an air inlet 536.

FIG. 5A also illustrates another embodiment, an airflow moderating apparatus 575b, which can be configured to be positioned immediately in front of the air inlet 536. In such a configuration, the airflow moderating apparatus 575b can be configured to substantially cover the individual air inlet 536 regardless of the height of the upper airflow path 545.

Figure 5B:
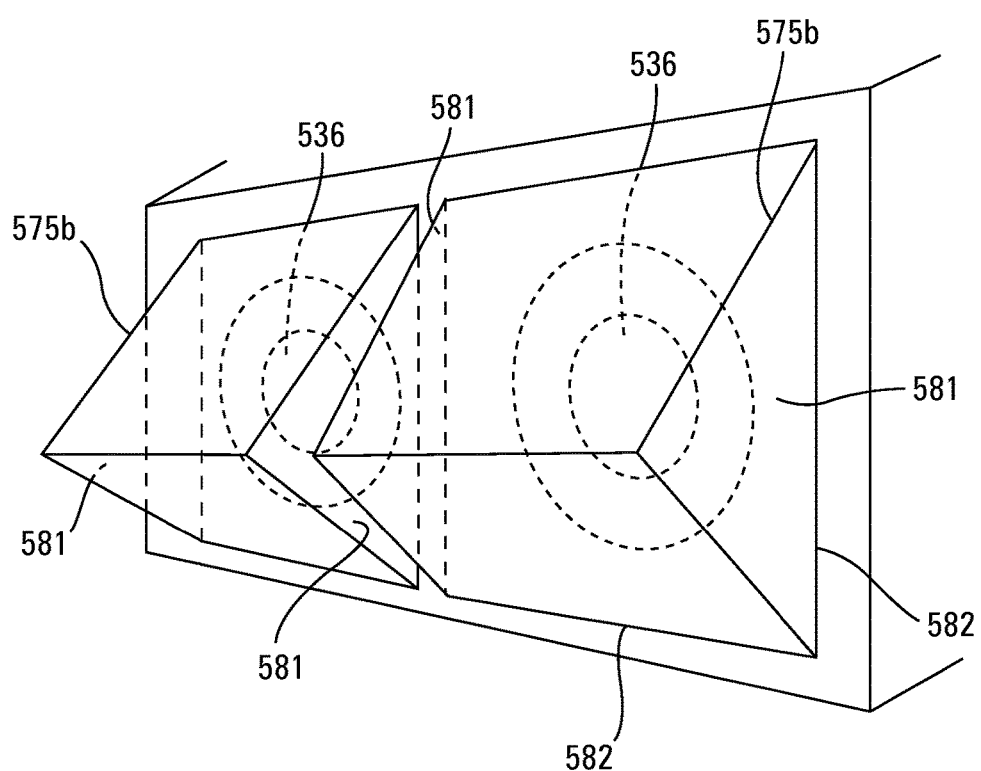

In FIG. 5B, the configuration of the airflow moderating apparatus 575b covering each of the air inlets 536 individually is further illustrated. The airflow moderating apparatus 575b has side panels 581 that are positioned substantially perpendicular and/or angular to a front face of the air inlet 536. The side panel 581 may not be necessary if the airflow moderating apparatus substantially covers the whole width of the airflow path such as illustrated in FIG. 3B.

In the illustrated embodiment in FIG. 5B, a base outline 582 generally encircles the air inlet 536. The base outline 582 can be any shape, such as rectangular, square, or round, that encircles the air inlet 536.

Figure 6:
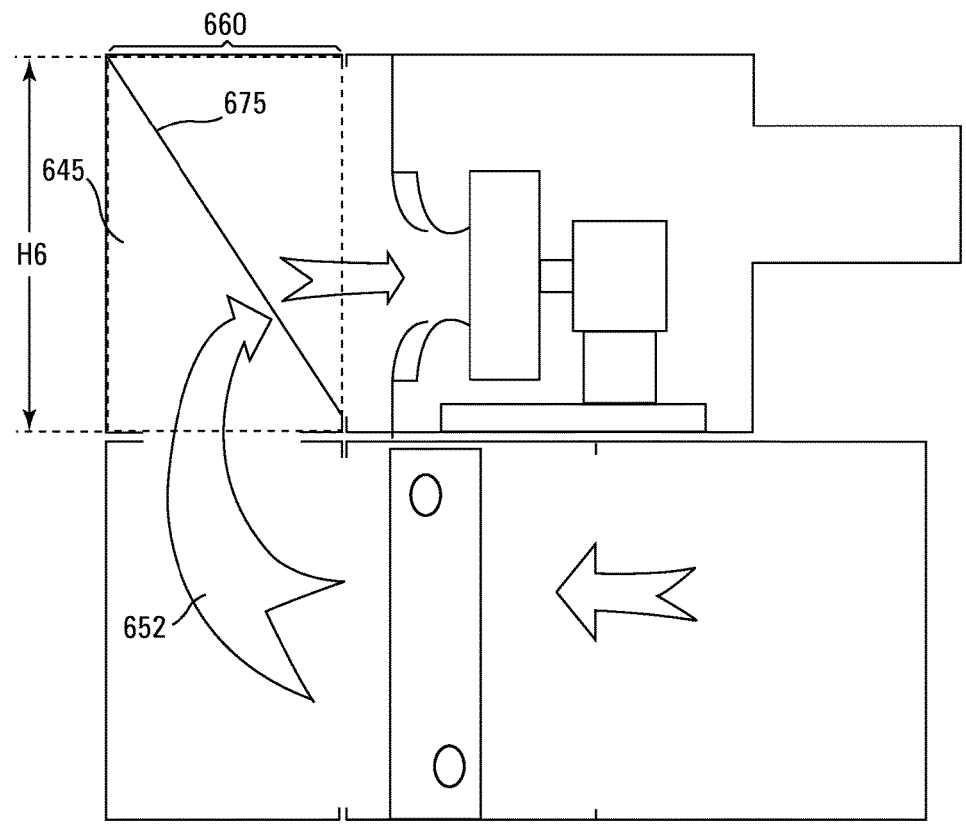
FIG. 6 illustrates an additional embodiment of the airflow moderating apparatus.

Referring now to FIG. 6, another embodiment of an airflow moderating apparatus 675 to create an airflow moderating zone 660 is illustrated. The airflow moderating apparatus 675 is generally a substantially planar sheet-like perforated material that is positioned in an upper airflow path 645 and intersects diagonally into the moving direction of a deviated airflow 652. The airflow moderating apparatus 675 can be a perforated sheet-like material made of metal, plastic, wood or any suitable materials. The airflow moderating apparatus 675 is generally configured to cover a height H6 and a width (not shown) of the upper flow path 645, so that a substantial part of the deviated airflow 652 can be moderated by the airflow moderating apparatus 675.

Figure 7A:
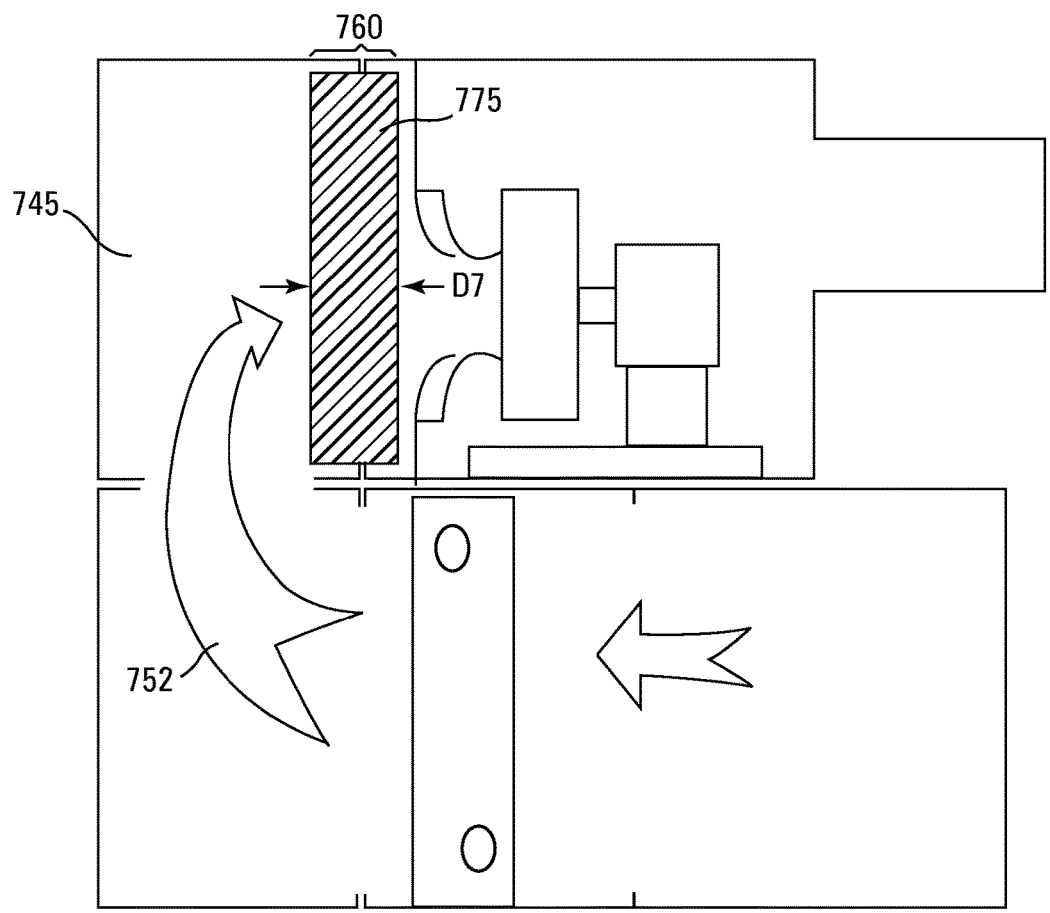
FIGS. 7A to 7C illustrate yet another embodiment of the airflow moderating apparatus.

Another embodiment of an airflow moderating apparatus 775 to create an airflow moderating zone 760 is illustrated in FIG. 7A. The airflow moderating apparatus 775 is a perforated material with a thickness D7 that is generally positioned in an upper airflow path 745. The airflow moderating apparatus 775 can be positioned substantially perpendicular to the moving direction of a deviated airflow 752.

Figure 7B:
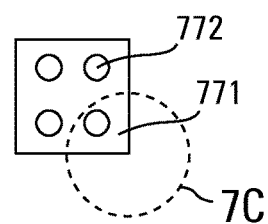
Figure 7C:
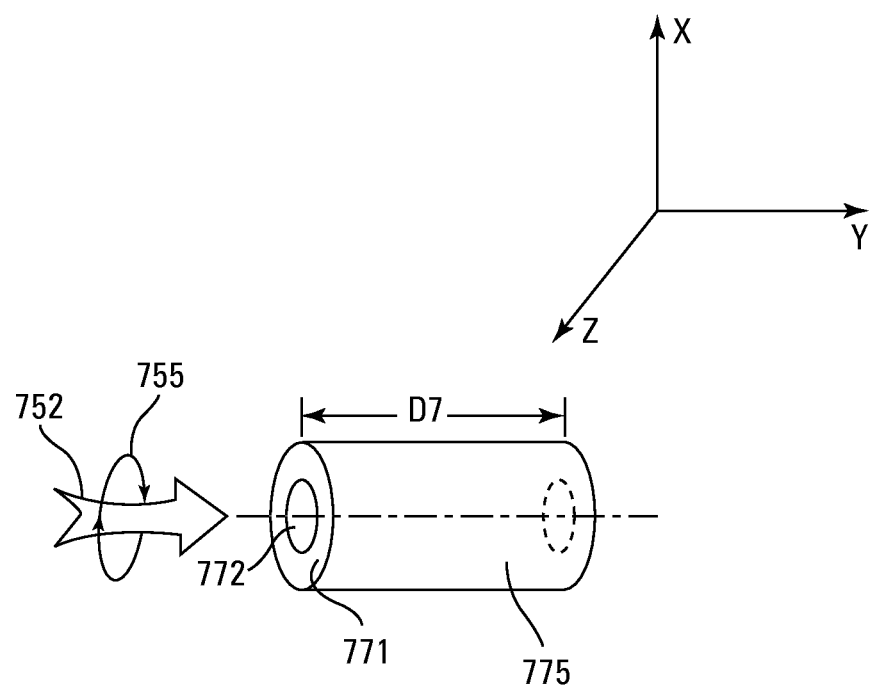

As shown in FIG. 7B, the airflow moderating apparatus 775 is configured to have an airflow resistance structure 771 and a plurality of air channels 772 through the airflow resistance structure 771. FIG. 7C illustrates an operation of area 7C in FIG. 7B. As illustrated, the air channel 772 is generally a cylinder shape with the thickness D7. As the airflow 752 passes through the air channel 772, at least a portion of the airflow 752 in the general direction can pass through the air channel 772. The airflow resistance structure 771 and a wall 775 of the flow-through structure 772 can provide airflow resistance to instabilities and/or turbulence that, for example, swirl or move in a plane 755 (which is about perpendicular to the general moving direction of the airflow 752 in the upper airflow path 745), to reduce the instabilities and/or turbulence. In some embodiments, the airflow moderating apparatus 775 may form an angle with the moving direction of the airflow 752. (Not shown.) The thickness D7 can be determined, for example, by testing. In some embodiments, the thickness D7 can be configured to achieve a desired goal of airflow instabilities/turbulence reduction. Generally, the larger the thickness D7, the more effective the instability/turbulence reduction effect of the airflow regulating zone 760 may be.

Figure 8:
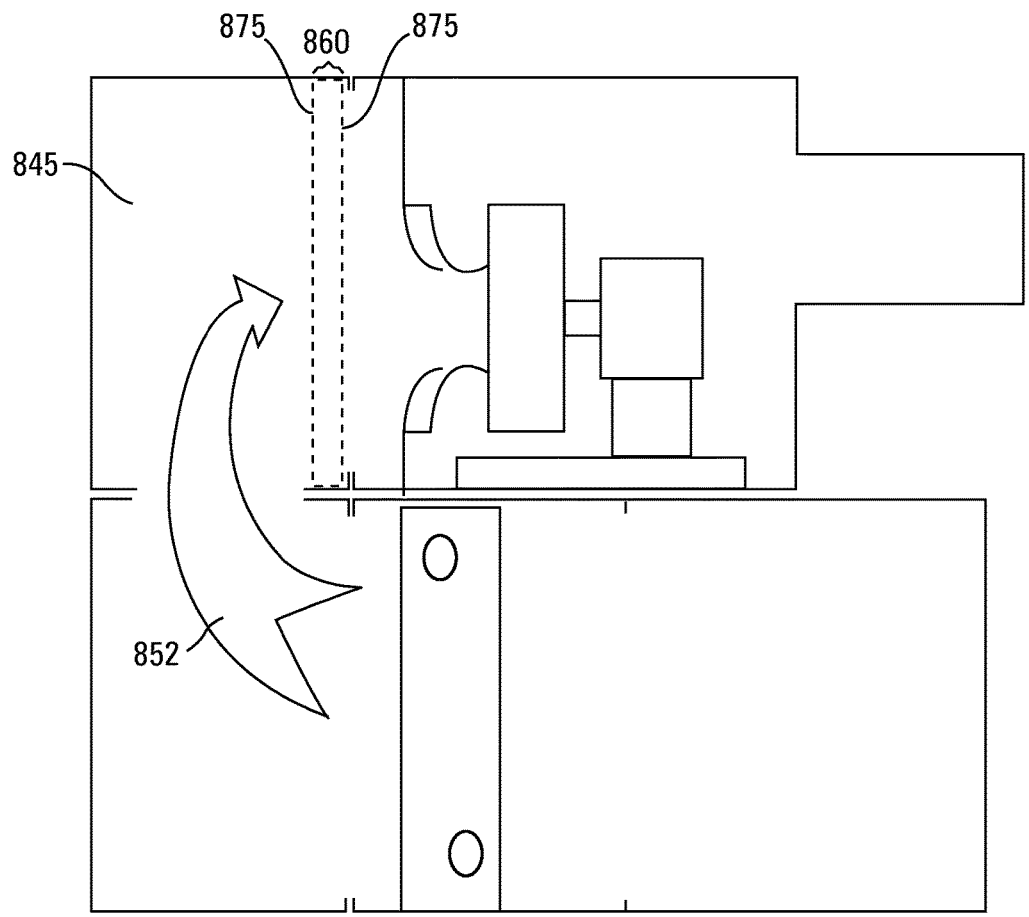
FIG. 8 illustrates another embodiment of the airflow moderating apparatus.

FIG. 8 illustrates yet another embodiment of an airflow moderating apparatus 875 to create an airflow moderating zone 860. The airflow moderating apparatus 875 can be configured to have a plurality of substantially planar perforated sheet-like materials (similar to the perforated sheet-like material 675 as illustrated in FIG. 6) positioned in series in an upper airflow path 845. In this configuration, the sheet-like materials of the airflow moderating apparatus 875 may not necessarily be positioned diagonally toward the moving direction of a deviated airflow 852, and can be positioned generally perpendicular to the moving direction of the deviated airflow 852. The airflow moderating apparatus 875 may generally cover the whole height and width of the upper airflow path 845. Each of the airflow moderating apparatus 875 may have the same air flow-through structures, or one of the sheet-like materials of the airflow moderating apparatus 875 may have different air flow-through structure from the other sheet-like material of the airflow moderating apparatus 875. Openings of the pieces of the sheet-like materials of the airflow moderating apparatus 875 can be offset or can be aligned. It is to be noted that the number of the plurality of the sheet-like materials of the airflow moderating apparatus 875 can be varied to meet a desired instability/turbulence reduction goal (for example to achieve a certain number of decibels reduction).

Figure 9A:
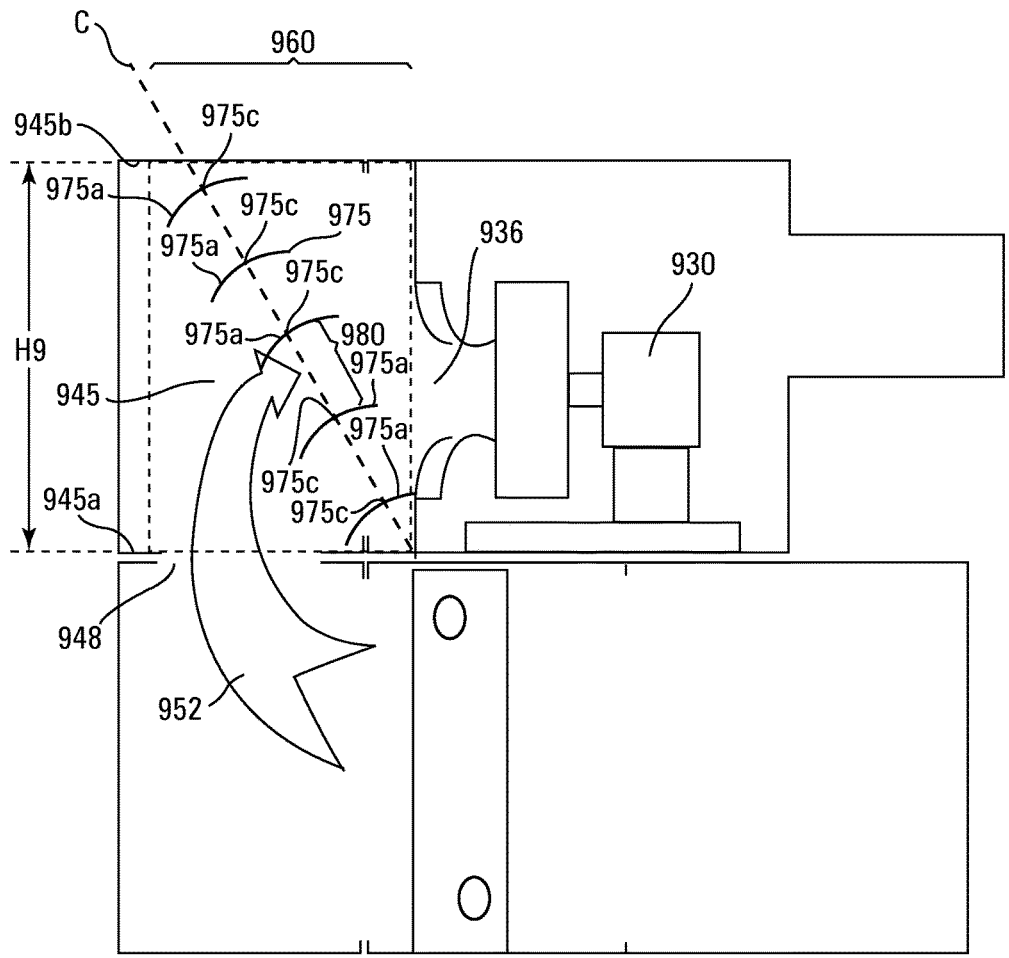
FIGS. 9A and 9B illustrate another airflow moderating apparatus, according to one embodiment.
Figure 9B:
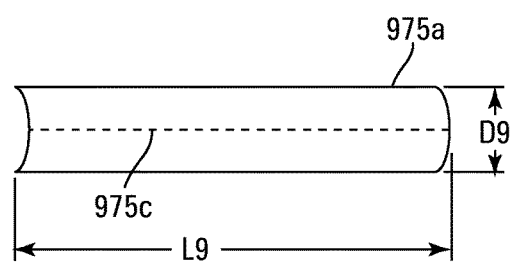
Figure 10:
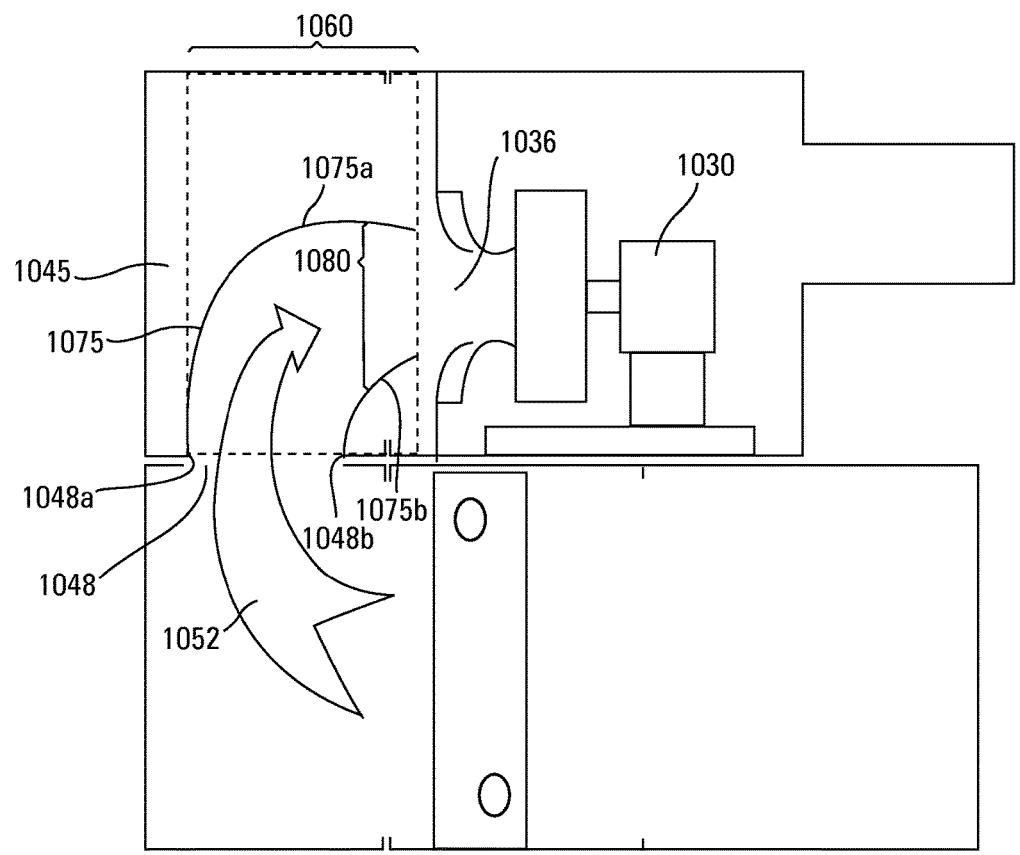
FIG. 10 illustrates yet another airflow moderating apparatus, according to one embodiment.

FIGS. 9A, 9B and 10 illustrate two other embodiments of an airflow moderating apparatus 975 and 1075 respectively.

As illustrated in FIG. 9A, the airflow moderating apparatus 975 is configured to include a plurality of curved flow directors 975a positioned in an upper airflow path 945 to create an airflow moderating zone 960.

As illustrated in FIG. 9B, the curved flow directors 975a are made of a sheet-like material and have a length L9 and a depth D9. The length L9 is about the same as a width (such as the width W3 in FIG. 3B) of the upper airflow path 945. As illustrated in FIG. 9A, the curved flow directors 975a are positioned so that the length L9 is about perpendicular to a plane of the cross section view as shown in FIG. 9A (i.e. when looking into the page).

The plurality of the curved flow directors 975a are arranged discretely along a height H9 between a bottom 945a and a top 945b of the upper airflow path 945. Each of the curved flow directors 975a can have a centerline 975c. As shown in FIG. 9A, from the bottom 945a to the top 945b, the centerlines 975c of the plurality of curved flow directors 975a are aligned along a line C that tilts into the airflow 952. Relative to a moving direction of the airflow 952, the line C is configured to be diagonally positioned relative to the moving direction of the airflow 952.

The arc of each curved or angled flow directors 975a can be generally configured to arch away from an opening 948. In other words, the arc of each curved flow directors 975a is curved in a direction that is generally the same as the turning direction of the airflow 952. The neighboring curved flow directors 975a can form an airflow passage 980 that turns from the opening 948 toward an air inlet 936.

In operation, the airflow 952 flows into the upper airflow path 945 through the opening 948 and makes a turn. The arcs of the curved flow directors 975 can direct the airflow 952 to turn toward the inlet 936 of a fan 930. The arcs of the curved flow directors 975 can also provide airflow resistance in directions that are perpendicular and/or angular to the moving direction of the airflow 952 to reduce instabilities and/or turbulence in the airflow 952.

It is to be appreciated that each of the plurality of curved flow directors 975a can be independently configured. For example, the size, curve length, length, depth, and position along the height H9 can be independently configured for each of the curved flow directors 975a. Generally, the curved flow directors 975a is diagonally aligned. However, in some embodiments, the centerlines 975c of the plurality curved flow directors 975a may not necessary be aligned along the line C. A total number of the curved flow directors 975a can also be varied based on, for example, design requirements.

In some embodiments, a number of the discrete curved flow directors 975a may be configured to be about 3 to 6. In some embodiments, the depth D9 is about 3-5 inches.

FIG. 10 illustrates that the airflow moderating apparatus 1075 can be configured to have a turning vane configuration to form an airflow moderating zone 1060. An airflow 1052 turns toward a fan 1030 after flowing through an opening 1048.

The airflow moderating apparatus 1075 is configured to include a first curved flow director 1075a and a second curved flow director 1075b positioned along a first side 1048a and a second side 1048b of the opening 1048 respectively. As illustrated, the first side 1048a corresponds to an outer side relative to the turning airflow 1052, and the second side 1048b corresponds to an inner side relative to the turning airflow 1052.

Relative to the cross section as shown in FIG. 10, the first curved flow director 1075a and the second curved flow director 1075b are configured to extend perpendicular to the cross section as shown in FIG. 10 when looking into the page (i.e. the curved flow directors 1075a and 1075b can be configured to extend along a width (such as the width W3 in FIG. 3) of an upper airflow path 1045). Lengths of the first and second curved flow directors 1075a and 1075b respectively may be configured to be about the same as a width of the upper airflow path 1045 (such as the width W3 in FIG. 3).

The first curved flow director 1075a and the second curved flow director 1075b are configured to have curves that turn the airflow 1052 toward an inlet 1036 of the fan 1030. In the orientation as shown in FIG. 10, the curve of the first curved flow director 1075a is generally longer than the curve of the second curved flow director 1075b. As shown in FIG. 10, the first curved flow director 1075a curves across the entire airflow moderating zone 1060, while the second curved flow director 1075b only curves across a portion of the airflow moderating zone 1060 and the second curved flow director 1075b is generally positioned in a portion of the airflow moderating zone 1060 that is relatively close to the air inlet 1036. The first and second curved flow directors 1075a and 1075b form an airflow passage 1080 that turns from the opening 1048 toward the inlet 1036 of the fan 1030.

In operation, the airflow 1052 flows between the first curved flow director 1075a and the second curved flow director 1075a (e.g. the airflow passage 1080), and is turned toward the inlet 1036 of the fan 1030. This turning vane configuration of the airflow moderating apparatus 1075 can provide smooth curves that can help smooth out the turning of the airflow 1052 to reduce the occurrence of the instabilities and/or turbulence, and/or provide airflow resistance in a direction that is perpendicular and/or angular to a moving direction of the airflow 1052 to reduce instabilities and/or turbulence.

It is to be appreciated that the embodiments as disclosed herein are exemplary. The general principle is that the airflow moderating apparatus may be configured to provide a sufficient airflow resistance perpendicular or angular to the general airflow direction (e.g. in a plane that parallel to the inlet of the fan, such as the inlet 136 as shown in FIG. 1) to reduce the instabilities/turbulences, but as little as possible airflow resistance in the general airflow direction. The air resistance structure can be configured, for example, as a tubes, flat/curved plates, turning vanes, flow directors or other suitable structures.

It is to be appreciated that the airflow moderating apparatus can have mixed configurations. For example, the airflow moderating apparatus can have openings with different shapes, such as circular and triangle. The sizes of the openings of the air flow-through structure can also vary in one flow moderating apparatus.

In some embodiments, the surface of the airflow moderating apparatus may further have some other surface features, such as protrusions, uneven surfaces, etc to provide airflow resistance. These surface features may also contribute to moderating the airflow to reduce instabilities and/or turbulence.

It is to be appreciated that the principles and embodiments described herein can generally be adapted for any device that can be benefit from airflow instabilities and/or turbulence reduction.

Example

Figure 11:
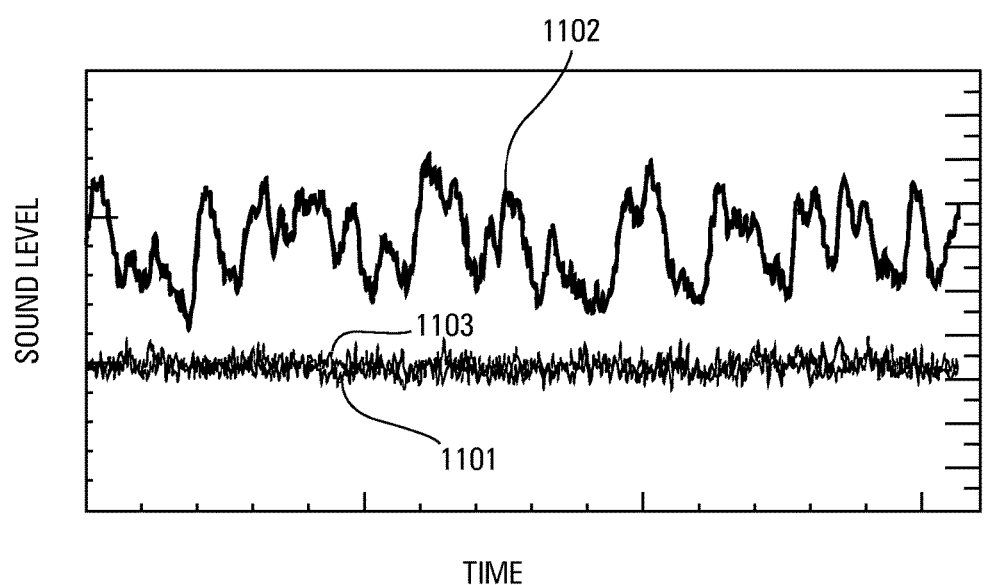
FIG. 11 illustrates an experiment data showing the effect of an airflow moderating apparatus.

FIG. 11 illustrates graphs of measured relative sound levels over time. The vertical axis is the measured relative sound level and the horizontal axis is time. The relative sound levels were measured near an air inlet of a HVAC system. Graph 1101 represents the measured relative sound levels in a HVAC system with a straight airflow path. Graph 1102 represents the measured relative sound levels when the airflow path of the HVAC system was configured to have a turn that is similar to what is shown in FIG. 1. Graph 1103 represents sound levels measured when the turning airflow path of the HVAC system had an airflow moderating apparatus that was configured similar to what is shown in FIG. 3A.

It is clear by comparing the graphs 1101 and 1102 that the relative sound levels were elevated if the airflow path has a turn. By comparing the graphs 1101 and 1103, it is clear that the airflow moderating apparatus effectively reduced the relative sound levels in the turning airflow path. Further, the relative sound levels in the configuration with the airflow moderating apparatus is comparable to the relative sound levels in the configuration with the straight airflow path, which indicates that the instabilities and/or turbulence caused by the turn in the airflow path is reduced by the airflow moderating apparatus.

Aspect 1 can be combined with any aspects 2-9. Any aspects 2-6 can be combined with any aspects 7-9. Aspect 7 can be combined with any aspects 8-9.

Aspect 1. A method of moderating an airflow in a HVAC system comprising:
propagating an airflow through an airflow path;
propagating the airflow through an airflow moderating zone;

in the airflow moderating zone, directing a first portion of the airflow to flow-through the airflow moderating zone in a direction that is defined by the airflow path; and in the airflow moderating zone, reducing a second portion of the airflow within the air moderating zone by providing airflow resistance in directions that are different from the direction of the first portion of the airflow so as to reduce instabilities in the airflow.

Aspect 2. An airflow system for a HVAC system comprising:
a contained airflow path defined by a housing of the HVAC system;
a fan having an inlet positioned in the housing;
the contained airflow path is configured to direct an airflow in a direction leading toward the inlet of the fan;
an air modulating apparatus positioned in the contained airflow path upstream of the inlet of the fan in the direction leading toward the inlet of the fan;
wherein the air modulating apparatus includes an airflow flow-through structure having a plurality of openings through an airflow resistance structure, and at least a portion of the airflow flow-through structure is positioned diagonally to the direction leading toward the inlet of the fan.

Aspect 3. The airflow system of aspect 2, wherein the air modulating apparatus is a perforated sheet-like material.

Aspect 4. The airflow system of aspect 3, wherein the sheet-like material is diagonally positioned in the contained airflow path upstream of the inlet of the fan.

Aspect 5. The airflow system of aspects 3-4, wherein the sheet-like material has at least one wedge, the at least one wedge has a peak that points to the direction leading toward the inlet of the fan Aspect 6. The airflow system of aspects 2-5, wherein the airflow moderating apparatus covers a substantial portion of the airflow path.

Aspect 7. An airflow system for a HVAC system comprising:
a contained airflow path defined by a housing of the HVAC system, the contained airflow path having an opening;
a fan having an inlet positioned in the housing, the inlet positioned downstream of the opening relative to an airflow direction and the opening and the inlet of the fan configured to be perpendicular to each other;
an air modulating apparatus positioned in the contained airflow path upstream of the inlet of the fan in the direction leading toward the inlet of the fan;
wherein the air modulating apparatus includes a plurality of curved flow directors arranged along a line that is diagonal to the airflow path, each of the plurality of curved flow directors arches away from the opening.

Aspect 8. An airflow system for a HVAC system comprising:
a contained airflow path defined by a housing of the HVAC system, the contained airflow path having an opening;
a fan having an inlet positioned in the housing, the inlet positioned downstream of the opening relative to an airflow direction and the opening and the inlet of the fan configured to be perpendicular to each other;
an air modulating apparatus positioned in the contained airflow path upstream of the inlet of the fan in the direction leading toward the inlet of the fan;
wherein the opening has a first side and a second side, the first side is further away from the inlet than the second side, the air modulating apparatus includes a first curved flow director along the first side of the opening and a second curved flow director along the second side of the opening.

Aspect 9. The airflow system of aspect 8, wherein the first curved flow director arches away from the opening, and the second curved flow direction arches toward the opening.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:

1. A method of moderating an airflow in an airflow system for an HVAC system, the airflow system includes a contained airflow path defined by a housing of the HVAC system, the contained airflow path including a lower airflow path and an upper airflow path, the upper airflow path being defined by at least a first top wall and a first bottom wall, the lower airflow path being defined by at least a second top wall and a second bottom wall, and the upper airflow path receiving an airflow from the lower airflow path via an opening in the first bottom wall and an opening in the second top wall; a fan having an inlet positioned in the upper airflow path, a heat exchanger being positioned in the lower airflow path, the upper airflow path has a height upstream of the inlet of the fan, and the inlet of the fan has a height, the height of the upper airflow path is larger than the height of the inlet of the fan; and an air modulating apparatus positioned in the upper airflow path, the airflow modulating apparatus is positioned upstream of the inlet of the fan, the air modulating apparatus extends across the upper airflow path, where a height of the air modulating apparatus is larger than the height of the inlet of the fan, the housing configured to receive air in the lower airflow path and provide the airflow in a first direction different from a second direction in which the air modulating apparatus and the inlet of the fan are configured to receive the airflow, the heat exchanger in the lower airflow path is configured to receive the airflow entering the housing in the first direction, the air modulating apparatus is spaced away and detached from the inlet of the fan, wherein the air modulating apparatus includes an airflow flow-through structure having a plurality of opening through an airflow resistance structure, and the air modulating apparatus is positioned diagonally in the upper airflow path upstream of the inlet of the fan relative to the second direction leading toward the inlet of the fan, the airflow modulating apparatus extends entirely across the height of the upper airflow path upstream of the inlet of the fan, the method comprising:
propagating an airflow through the contained airflow path;
propagating the airflow through an airflow moderating zone defined by the air modulating apparatus;
in the airflow moderating zone, directing a first portion of the airflow to flow-through the airflow moderating zone in a direction that is defined by the upper airflow path; and
in the airflow moderating zone, reducing a second portion of the airflow within the air moderating zone by providing airflow resistance in directions that are different from the direction of the first portion of the airflow so as to reduce instabilities in the airflow.

2. An airflow system for an HVAC system comprising:
a contained airflow path defined by a housing of the HVAC system, the contained airflow path including a lower airflow path and an upper airflow path, the upper airflow path being defined by at least a first top wall and a first bottom wall, the lower airflow path being defined by at least a second top wall and a second bottom wall, and the upper airflow path receiving an airflow from the lower airflow path via an opening in the first bottom wall and an opening in the second top wall;

a fan having an inlet positioned in the upper airflow path, a heat exchanger being positioned in the lower airflow path, the upper airflow path has a height upstream of the inlet of the fan, and the inlet of the fan has a height, the height of the upper airflow path is larger than the height of the inlet of the fan; and an air modulating apparatus positioned in the upper airflow path, the air flow modulating apparatus is positioned upstream of the inlet of the fan, the air modulating apparatus extends across the upper airflow path, where a height of the air modulating apparatus is larger than the height of the inlet of the fan, the housing configured to receive air in the lower airflow path and provide the airflow in a first direction different from a second direction in which the air modulating apparatus and the inlet of the fan are configured to receive the airflow, the heat exchanger in the lower airflow path is configured to receive the airflow entering the housing in the first direction, the air modulating apparatus is spaced away and detached from the inlet of the fan, wherein the air modulating apparatus includes an airflow flow-through structure having a plurality of opening through an airflow resistance structure, and the air modulating apparatus is positioned diagonally in the upper airflow path upstream of the inlet of the fan relative to the second direction leading toward the inlet of the fan, the airflow modulating apparatus extends entirely across the height of the upper airflow path upstream of the inlet of the fan.

3. The airflow system of claim 2, wherein the air modulating apparatus is a perforated planar material.

4. The airflow system of claim 2, wherein the first direction is opposite to the second direction.

* * * * *